Figure 21:
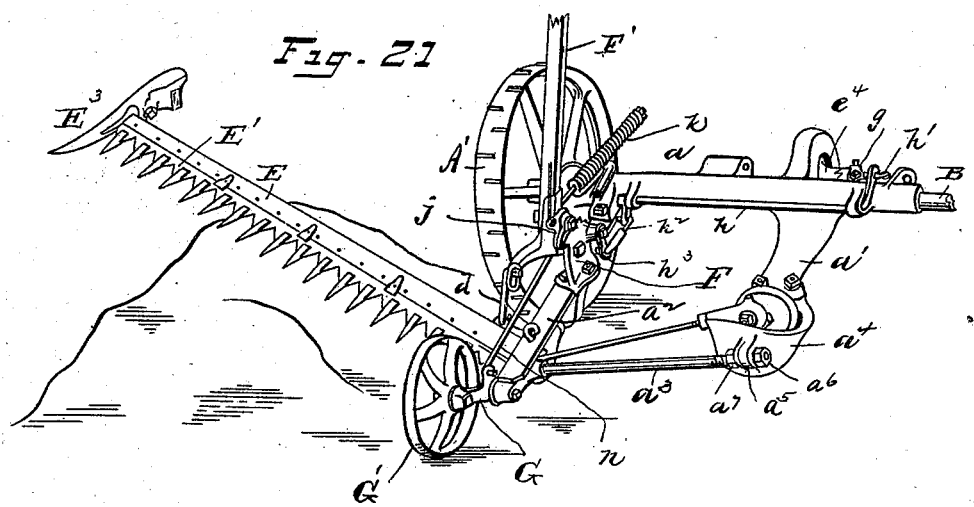

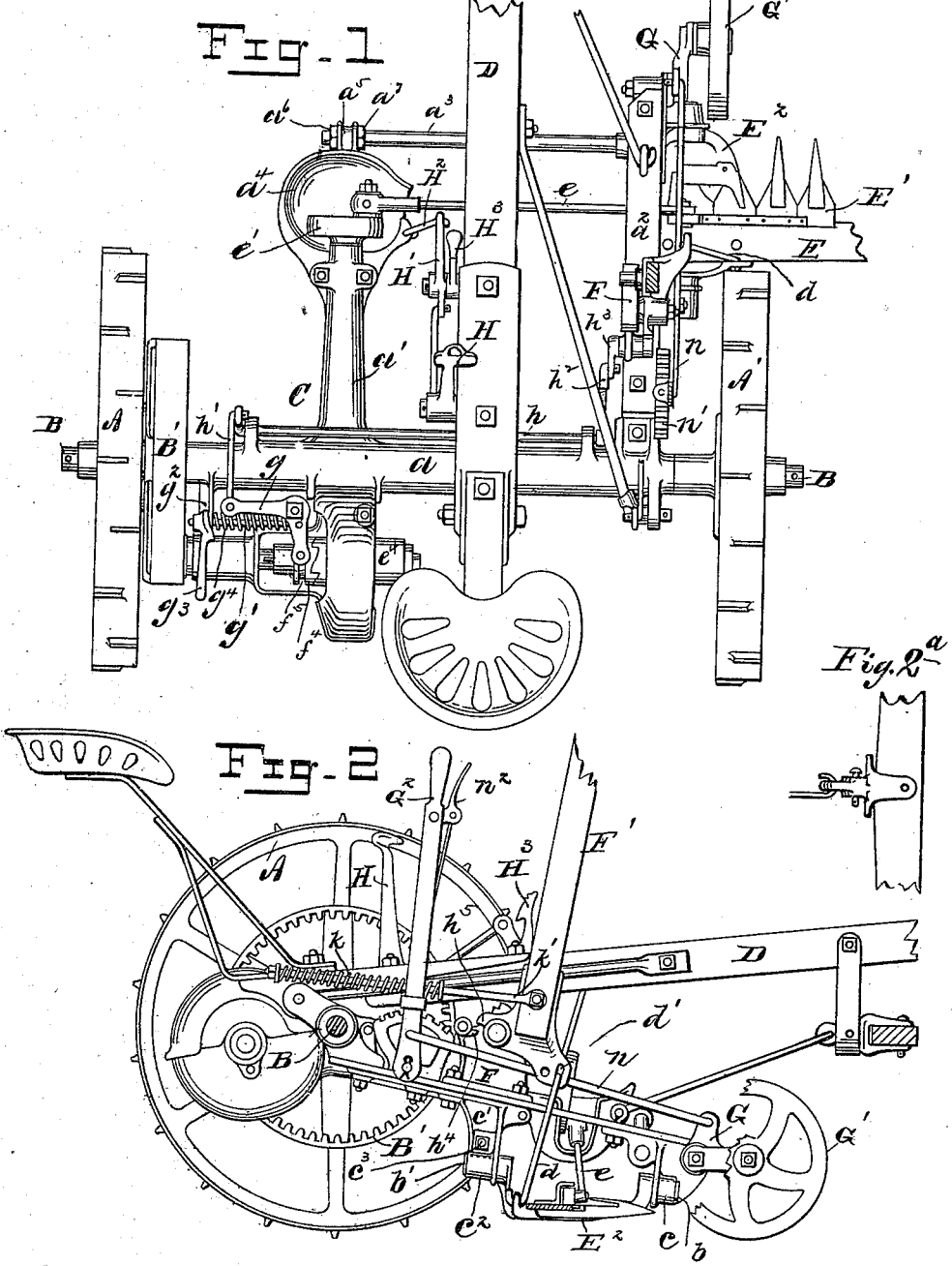

No. 669,717. Patented Mar. 12, 1901.
W. N. WHITELY.
MOWING MACHINE.
(Application filed Feb. 24, 1893.)
(No Model.) 6 Sheets—Sheet 2.
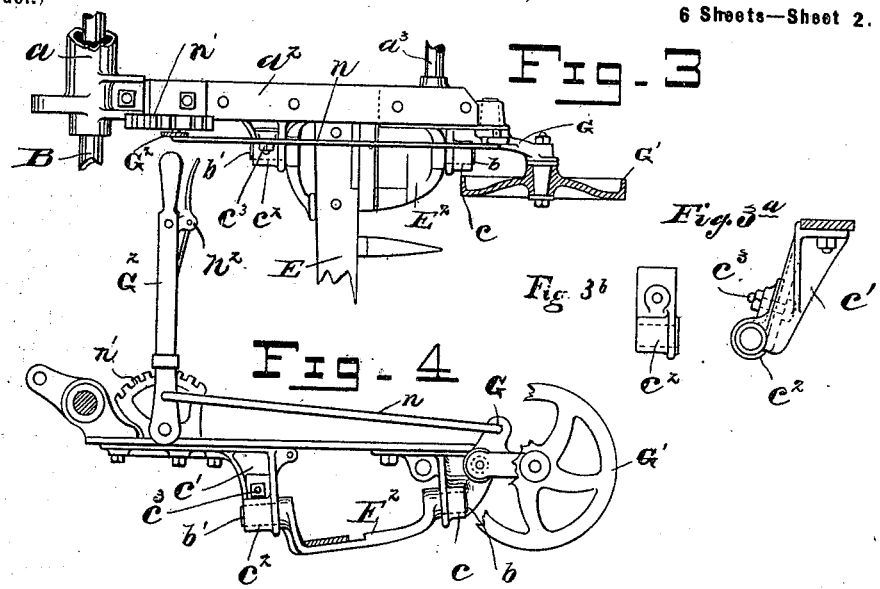
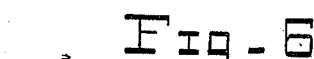
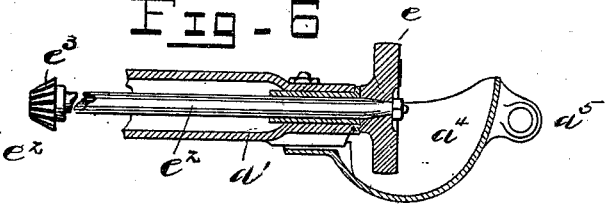
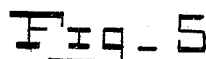
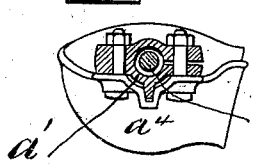
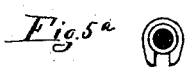
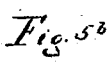
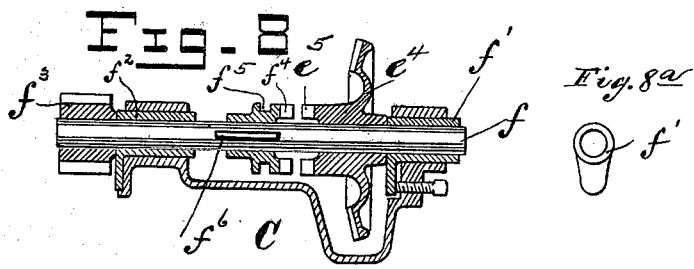
WITNESSES
Robt Weiskotten
Frank Watt
INVENTOR
William N. Whitely
By Staley and Shepherd
Attys No. 669,717. Patented Mar. 12, 1901.
W. N. WHITELY.
MOWING MACHINE.
(Application filed Feb. 24, 1893.)
(No Model.) 6 Sheets—Sheet 3.
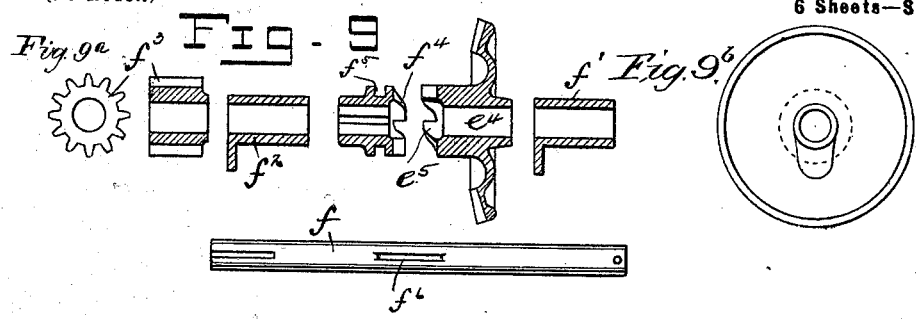
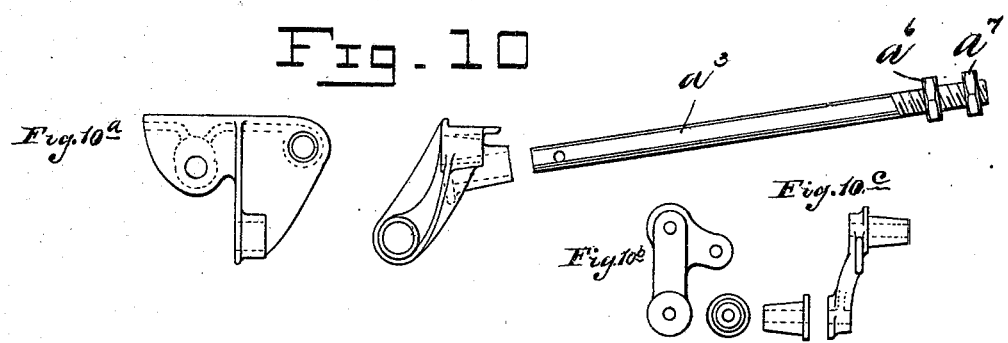
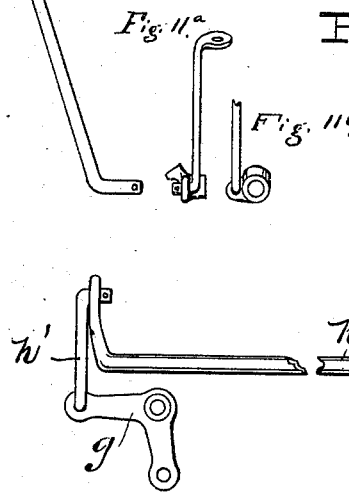
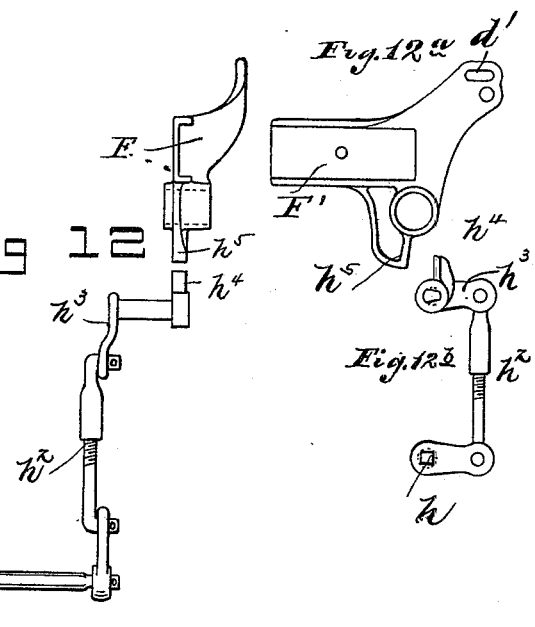
WITNESSES
Robt. Weiskotten
Frank Watt
INVENTOR
William N. Whitely
By Staley & Shepherd No. 669,717. Patented Mar. 12, 1901.
W. N. WHITELY.
MOWING MACHINE.
(Application filed Feb. 24, 1893.)
(No Model.) 6 Sheets—Sheet 4.
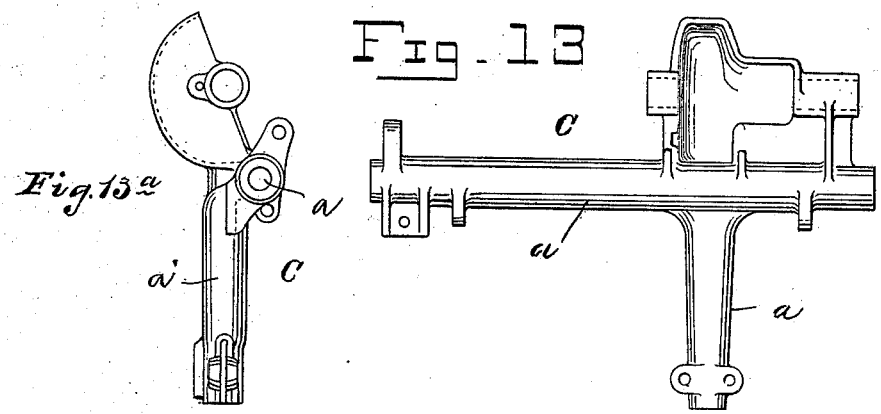
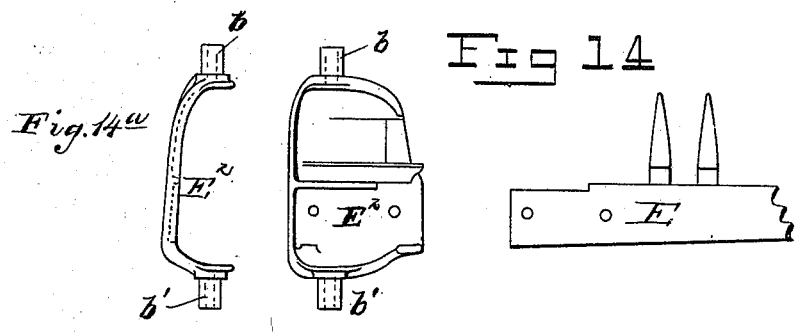
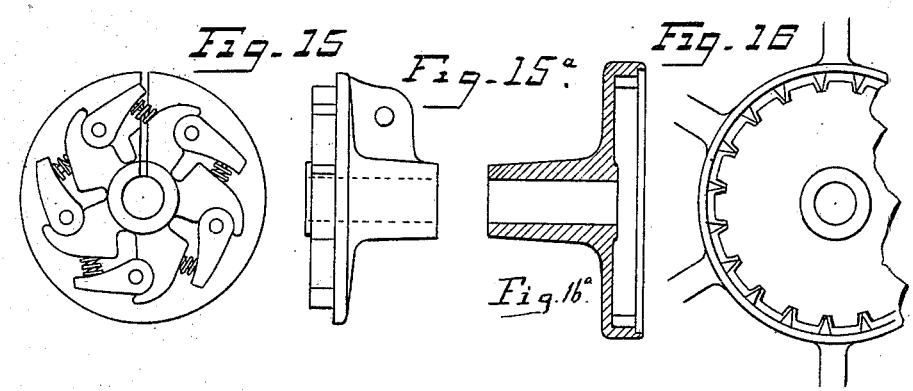

No. 669,717. Patented Mar. 12, 1901.
W. N. WHITELY.
MOWING MACHINE.
(Application filed Feb. 24, 1893.)
(No Model.) 6 Sheets—Sheet 5.
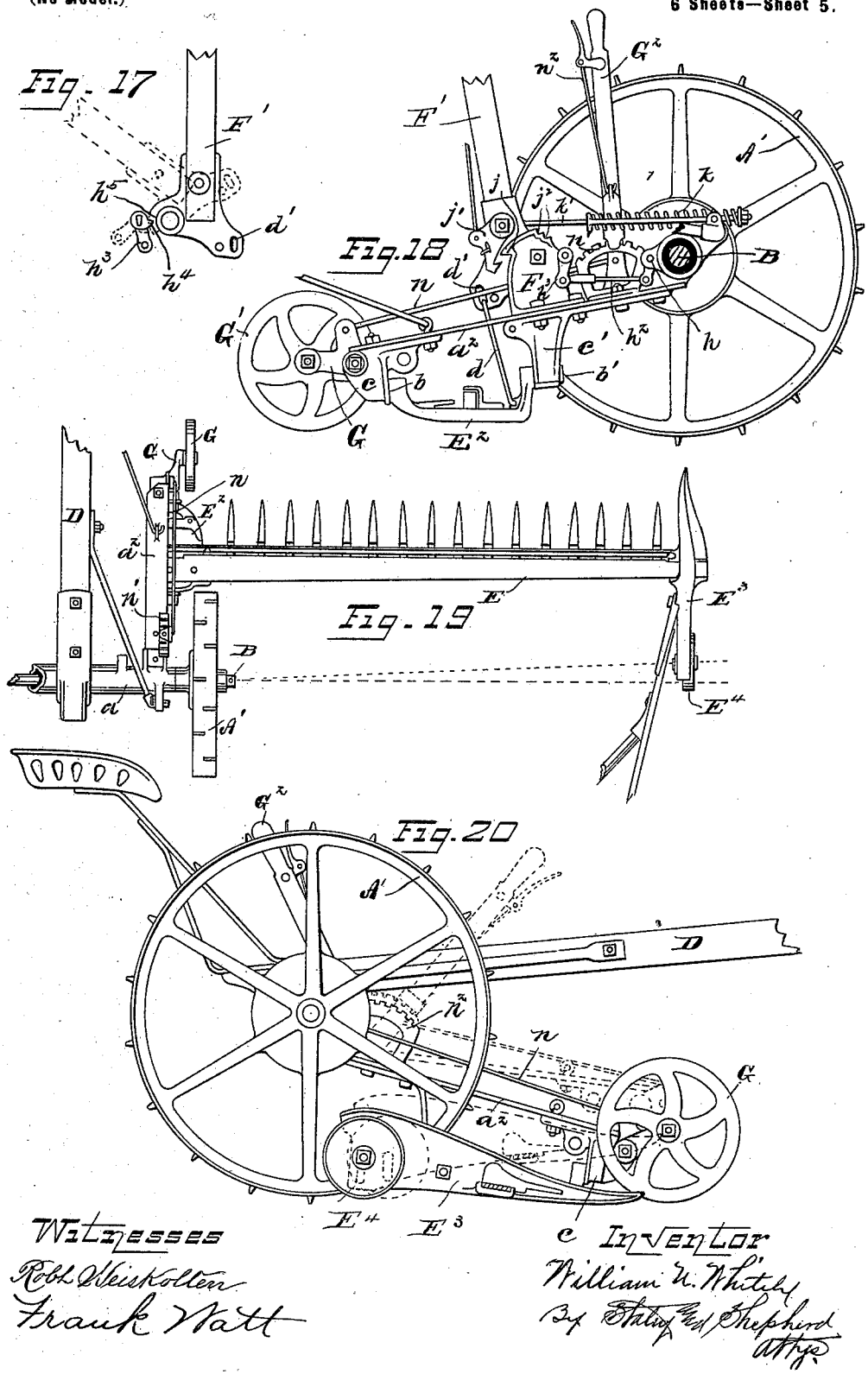

No. 669,717. Patented Mar. 12, 1901.
W. N. WHITELY.
MOWING MACHINE.
(Application filed Feb. 24, 1893.)
(No Model.) 6 Sheets—Sheet 6.

WITNESSES:
Robt. Weiskotten
Frank Natt

INVENTOR
William N. Whitely
BY
ATTORNEYS

UNITED STATES PATENT OFFICE.

WILLIAM N. WHITELY, OF SPRINGFIELD, OHIO.

MOWING-MACHINE.

SPECIFICATION forming part of Letters Patent No. 669,717, dated March 12, 1901.

Application filed February 24, 1893. Serial No. 463,580. (No model.)

*To all whom it may concern:*

Be it known that I, WILLIAM N. WHITELY, a citizen of the United States, residing at Springfield, in the county of Clark and State of Ohio, have invented certain new and useful Improvements in Mowing-Machines, of which the following is a specification.

My invention relates to improvements in mowing-machines; and one object of my invention to provide a mowing-machine employing a long pitman to drive the cutting-knife which shall have the largest possible range of working capacity, the construction and arrangement of parts being such that the operator may set the cutting apparatus into a vertical position without stopping the machine through the intervention of an automatic disengaging device for the mechanism which operates the cutters, which shifting or disengaging device shall operate positively and uniformly in whatever position the machine may occupy.

A further object of my invention is to provide a mowing-machine having an automatic shifting device for engaging and disengaging the mechanism for operating the cutting apparatus as the said cutting apparatus is raised or lowered by the lifting-lever and a stop or lock to prevent the disengagement of the said mechanism when the cutting apparatus is raised independent of the lifting-lever.

A further object of my invention is to provide a mowing-machine having a vibrating gear-frame and a hinged pole or tongue and a lead or grass wheel pivotally connected to the inner corner of the vibrating gear-frame and means for raising and lowering the frame in reference to said wheel, and thus raise and lower the cutting apparatus, said parts being so arranged that the frame may be operated in reference to the grass-wheel no matter what position the cutting apparatus may occupy, either horizontal or vertical.

A further object of my invention is to provide a novel arrangement of the cutting apparatus and means for connecting it to the vibrating gear-frame, whereby the said cutting apparatus is rendered removable, so as to be connected to or disconnected from the machine.

My invention consists in the various constructions and combinations of parts hereinafter described, and pointed out in the claims.

Figure 22:
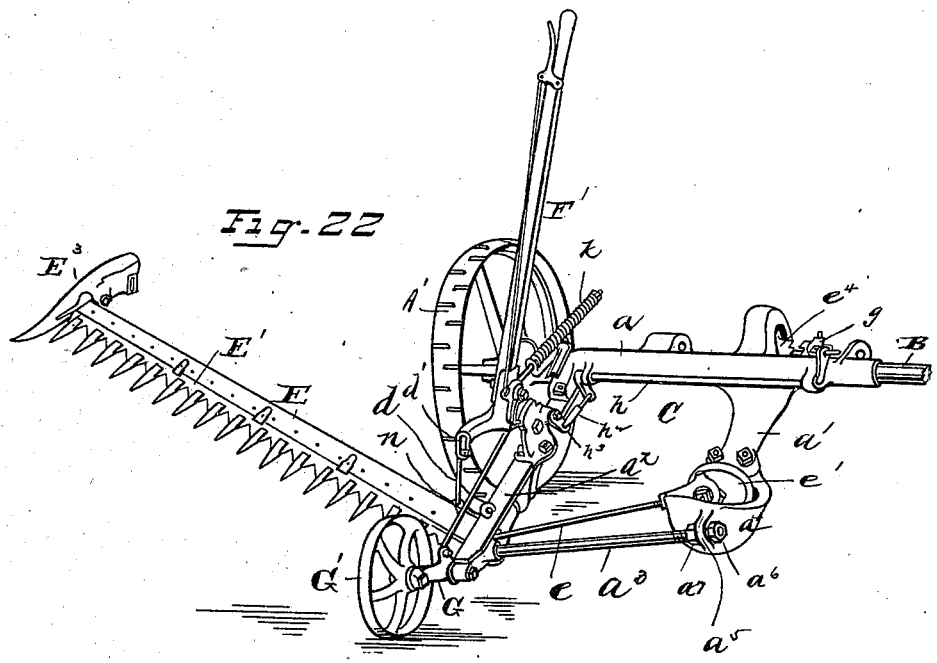

In the accompanying drawings, which form a part of this specification, Figure 1 is a plan view of a device embodying my invention. Fig. 2 is a side elevation of the same with the driving-wheel removed. Fig. 2ª is a detail view of the draft connection of Fig. 2. Figs. 3 and 4 are respectively a plan and elevation of a portion of the frame, showing the method of attaching the cutting apparatus and the adjustable grass-wheel at the front end of the vibrating gear-frame. Fig. 3ª is a detail view of a portion of the same, one of the parts being detached. Figs. 5 and 6 are respectively transverse and longitudinal sectional views of the fly-wheel shaft and its supporting parts. Figs. 5ª and 5ᵇ are details of the same. Fig. 7 is a side elevation of a portion of the fly-wheel-shaft box, and Fig. 7ª is a top view of the same. Fig. 8 is a longitudinal sectional view of a part of the driving-gear for actuating the cutting apparatus. Fig. 8ª is a detail view of one of the bearings of the same. Fig. 9 is a diagrammatic view of the individual parts in Fig. 8. Figs. 9ª and 9ᵇ are end elevations of the same. Fig. 10 is a detail view of the brace connection of the gear-frame with the parts shown separate. Fig. 10ª is an end view of the same. Figs. 10ᵇ and 10ᶜ are details of the grass-wheel supporting and operating devices. Fig. 11 is a diagrammatic view showing the brace connections of the tongue and lifting-lever. Figs. 11ª and 11ᵇ are details of the same. Fig. 12 is a diagrammatic view of the gear-shifting apparatus. Figs. 12ª and 12ᵇ are details showing individual parts of the same. Fig. 13 is a plan view of a portion of the main frame. Fig. 13ª is a side elevation of the same. Fig. 14 is a detail of a portion of the cutting apparatus, showing the method of attaching the inner shoe. Fig. 14ª is an end view of the same. Figs. 15, 15ª, 16, and 16ª are detail views of the main driving-wheel and the clutch devices therefor. Fig. 17 is a detail of the lifting-lever and the gear-shifting device. Fig. 18 is a partial sectional view showing the arrangement of the cutting apparatus, lifting-lever, and gear-shifter. Fig. 19 is a partial plan view showing the arrangement of the cutting apparatus and the method of attaching it to the main frame. Fig. 20 is an end elevation showing the arrangement and operation of the vibrating gear-frame and the adjustable lead-wheel thereon. Figs. 21 and 22 are perspective views illustrating the operation of the raising and lowering of the cutting apparatus in connection with the gear-shifting device.

Like parts are represented by similar letters of reference in the several views.

In the said drawings, A A' represent the main driving and carrying wheels. B is the main axle, supported by said driving-wheels, but adapted to turn independent thereof, a connection being formed from each of said driving-wheels to said axle by a pawl-and-ratchet device in the usual manner—such, for instance, as illustrated in Figs. 15 and 16—so that the axle shall turn with said wheels when the machine is moving in a forward direction and the wheels turn independently of said axle when the machine is moving in a backward direction.

C is the main frame, which consists, essentially, of four principal parts, as follows: a tubular box or sleeve $a$, journaled on the main axle B, a tubular box or sleeve $a'$, preferably cast integral with the main tube $a$ and adapted to carry the fly-wheel shaft, as hereinafter more fully specified, a forwardly-projecting side arm $a^2$, connected at one end by suitable bolts or otherwise to the main tube $a$, and an adjustable connecting-brace $a^3$, which connects the forward end of the tube $a'$ with the side arm $a^2$. This frame C carries all the operating parts, and to this frame C is hinged the tongue or pole D, preferably at a point in rear of the main axle B.

The cutting apparatus consists, essentially, of the usual finger-bar E and reciprocating knife E'. The finger-bar E is provided at the inner end with a shoe $E^2$, which shoe is provided at opposite ends with projecting trunnions $b\ b'$. Connected to the side arm $a^2$ of the vibrating gear-frame C are depending brackets $c\ c'$, each of which is provided near its lower extremity with a bearing for the respective trunnions $b\ b'$ of the shoe $E^2$, one of these bearings being a solid bearing and formed with the bracket $c$, the other consisting of a removable box $c^2$, adapted to be secured to the bracket $c'$, preferably by a single bolt connection $c^3$, this arrangement being such that by removing the bolt $c^3$ the cutting apparatus may be removed by removing the bearing $c^2$, after which the trunnion $b$ may be readily removed from the solid bearing in the bracket $c$. The arrangement of the inner shoe with the trunnions as described forms a hinged connection between the cutting apparatus and the vibrating gear-frame.

To provide for raising and lowering the cutting apparatus, so as to change the angle thereof about this hinge connection from a horizontal to a vertical position, I provide on the gear-frame a ratchet-stand F, preferably secured to the forwardly-projecting side arm $a^2$ of said frame by the same bolts which connect the bracket $c'$ thereto. To this ratchet-stand is pivoted the lifting-lever F', which is connected by a link connection $d$ to the shoe $E^2$ at a point slightly removed from the center of oscillation about the trunnions $b\ b'$, this link $d$ being attached to the lifting-lever F' in a slotted opening $d'$, whereby a limited independent movement is secured between said parts.

The power to drive the knife E' is transmitted through a pitman $e$, which is connected to a crank-wheel $e'$ on the end of a crank-shaft $e^2$, journaled in the tube or box $a'$, forming a part of the main frame. This crank-shaft $e^2$ is provided at the opposite end with a beveled pinion $e^3$, adapted to be engaged by a beveled gear $e^4$, adapted to turn loosely on a counter-shaft $f$, which counter-shaft is supported in suitable bearings $f'\ f^2$, formed on the main vibrating gear-frame C. The counter-shaft $f$ is provided at one end with a spur-pinion $f^3$, secured rigidly to said shaft and adapted to mesh with an internal spur-gear B', rigidly secured to the main axle B, so that a rotation of said axle produces a corresponding rotation of the counter-shaft $f$, though at an increased speed, owing to the relative sizes of the gear B' and the pinion $f^3$. One end of the hub of the beveled gear $e^4$ is provided with ratchet or clutch teeth $e^5$, adapted to be engaged by similar teeth on a clutch-collar $f^4$, supported on the counter-shaft $f$ and connected thereto by a spline connection $f^6$, which permits a longitudinal movement of said clutch-collar on said shaft while maintaining a driving connection between the two. This clutch-collar $f^4$ is adapted to be operated longitudinally on said shaft by a bell-crank lever $g$, having a bifurcated arm which embraces said clutch-collar and is provided with suitable projections engaging in a peripheral groove $f^5$ therein in a well-known manner. Pivotally connected at one end to the bell-crank lever $g$ is a link or connecting-bar $g'$, the opposite end of which is projected through a perforated lug $g^2$ on the main gear-frame and is provided with a cam-shaped operating-lever $g^3$, adapted when turned on said link to produce a longitudinal movement thereof, and thus operate said bell-crank lever, so as to withdraw the clutch-collar $f^4$ from engagement with the beveled gear $e^4$, a spring $g^4$, which surrounds said link and bears at one end against the lug $g^2$ and at the other against the bell-crank lever $g$, being adapted to return the parts to their engaging position when the operating-lever $g^3$ is turned to its normal position, as shown in Fig. 1. It will be understood that the cam-shaped lever $g^3$ bears against the perforated lug $g^2$ and is adapted to remain in either position of adjustment, so as to hold said clutch out of engagement or permit it to engage by the action of the spring $g^4$, as the case may be, the construction being such, however, that the bell-crank lever $g$ may be operated against the spring $g^4$ independent of said operating-lever $g^3$.

The counter-shaft $f$ is preferably made short, so that the crank-shaft box $a'$, which forms a part of the main frame, is located on that side of said frame which is farthest removed from the cutting apparatus, the said crank-shaft box $a'$ and the forwardly-projecting bar $a^2$ being preferably located on opposite sides of the tongue D at equal distances therefrom. It will be seen by this construction that a long pitman is secured for driving the knife E'. In changing the angle of the cutting apparatus, however, in raising from a horizontal to a vertical position it is obvious that a point will be reached at which the pitman $e$ will not operate the reciprocating knife E'. To compensate for this and to provide means whereby the cutting apparatus may be raised to any desired height by the operator without stopping the machine, I provide on the vibrating gear-frame a shifting mechanism adapted to operate in connection with the lifting-lever, so that when the lifting-lever is operated to raise the cutting apparatus to a point beyond that at which the pitman will successfully operate the crank-shaft will be automatically thrown out of gear. In this connection I further provide a lock or stop adapted to prevent the cutting apparatus from being accidentally lifted until it assumes an angle beyond which the knife will operate. In carrying out this part of my invention I employ a rock-shaft $h$, journaled in suitable bearings on the vibrating frame C and connected at one end by a link $h'$ to the bell-crank lever $g$ and at the opposite end by a two-part adjustable link $h^2$ to a small rock-shaft $h^3$, journaled in the ratchet-stand F. This rock-shaft $h^3$ is provided at one end with an engaging lug or finger $h^4$, adapted to contact with a similar lug or finger $h^5$ on the lifting-lever F' when said lever is turned to a position which will raise the cutting apparatus to a point at which the pitman ceases to be operated. The contact between the lugs $h^4$ and $h^5$ produces a rotative movement of the crank-shaft $h$, which operates the bell-crank lever $g$, and withdraws the clutch-collar $f^4$ and disengages the knife-driving mechanism. The projection $h^5$ is so formed that the gear-shifter is operated by a slight movement of the lever after contacting with the finger, and it remains in contact with the finger $h^4$ and holds the parts thus disengaged as long as the knife is in an elevated position, the construction of the parts being such as to release the bell-crank lever and permit the spring to instantly reëngage the clutch when the lifting-lever reaches the proper position.

The ratchet-stand F is provided at one side with an engaging projection $j$, adapted to be engaged by a hook-shaped latch $j'$ on the lever F', which latch is adapted to be controlled by a thumb-latch on said lever in the ordinary way. The hook-shaped latch $j'$ and the projection $j$ stand normally in line with each other, though slightly separated, so as to permit a limited movement of said lever and therefore of the cutting apparatus before said parts engage. In the event, however, that the cutting apparatus should be turned on its hinged connection after the link $d$ has moved to the upper end of the slot $d'$ and the lever $f'$ moved until the hook-shaped latch $j'$ engages with the projection $j$, the further movement of the cutting apparatus is stopped unless the entire vibrating gear-frame C is moved about the axle B. The cutting apparatus is thus prevented from being accidentally moved to a point at which the driving mechanism will be disengaged, so that the cutting apparatus can never be thrown out of gear in passing over hills or knolls, the operation of the parts under such conditions being illustrated in Fig. 21. When it is desired, however, by the operator to lift the cutting apparatus, the latch $j'$ is withdrawn and the lifting-lever $f'$ drawn back until the latch $j'$ rests against the ratchet-notches $j^2$ on the opposite side of the ratchet-stand, which holds the cutting apparatus in the desired position of adjustment. A spring $k$, connected by a link $k'$ to the lifting-lever, is preferably employed for assisting the operation in lifting the cutting apparatus.

It will be seen that by the constructions above described the cutting apparatus may be readily raised to any position by the operator and that when raised to such an angle that the pitman ceases to be operative its driving mechanism will be positively, quickly, and uniformly disconnected, and this without reference to the position which the vibrating gear-frame may occupy with reference to the tongue or other parts of the machine, since all the parts are supported upon the vibrating gear-frame, and thus positively maintained in their relative positions without reference to the adjustment of the other parts, the two-part adjustable link $h^2$ forming part of the connection between the gear-shifter and the lifting-lever and permitting an adjustment by which this intermediate mechanism may be brought to the exact condition necessary to effect a substantially instantaneous operation of the gear-shifter in either direction by a limited movement of the lifting-lever.

Pivoted to the front of the vibrating gear-frame and at the inner corner thereof, approximate to where the cutting apparatus is hinged thereto, is a bell-crank arm G, which carries an adjustable supporting-wheel G', which I term the "lead" or "grass" wheel. This bell-crank arm G is connected by a link connection $n$ to a hand-lever $G^2$, pivoted to a suitable ratchet-supporting stand $n'$ on the vibrating gear-frame and provided with a suitable spring-bolt and thumb-latch $n^2$ for holding said lever in different positions of adjustment, means being thus provided by which the vibrating gear-frame may be raised or lowered, so as to change the angular position thereof, and thus change the vertical height of the cutting apparatus, the adjustment of the vibrating gear-frame and the height of the cutting apparatus being thus independent of the raising and lowering of the cutting apparatus about its hinged connection to said frame. The finger-bar E is provided at its outer extremity with an outer shoe $E^3$, having a suitable supporting-wheel $E^4$, the shoe $E^3$ being made of considerable length, so that the center of the wheel $E^4$ will be approximately in line with the center of the main axle B, thus causing the outer and inner ends of the cutting apparatus to be raised substantially uniformly by the adjustment of the grass-wheel $G'$.

As before stated, the connecting-bar $a^3$ of the vibrating gear-frame connects the crank-box $a'$ and the forwardly-projecting side bar $a^2$. For this purpose the axle-box is provided with a forwardly-extending portion $a^4$, curved, preferably, around the crank-wheel to a point in front of the same and also outwardly and upwardly to form a shield for the crank-wheel $e'$, the extended portion being provided with a perforated lug $a^5$, through which the bar $a^3$ is adapted to extend, said bar being screw-threaded at the end and provided with adjusting-nuts $a^6$ $a^7$ on opposite sides of the lug $a^5$. This bar $a^3$ is thus arranged in front of and substantially parallel to the plane of the pitman $e$ and forms a guard for the same, while by the arrangement of the screw-threaded portion and the nuts thereon means are provided by which said bar $a^2$ may be adjusted to or from the stationary box or sleeve $a'$, and thus line up the cutting apparatus which is attached to said side bar.

It will be seen from the above-described constructions that all the operating parts are supported directly on the vibrating gear-frame and in such positive operating positions that all of said parts operate uniformly and positively, no matter what position of adjustment the different parts may assume with reference to each other. Means are preferably provided by which the forward end of the gear-frame may be elevated. This is preferably accomplished by a bell-crank foot-lever H, pivoted to the tongue and connected at one end to an intermediate lever H', which in turn is connected by a link connection $H^2$ to the gear-frame, preferably at a point near the fly-wheel $e'$. A pivoted latch or hook $H^3$, also on the tongue, is adapted to engage the foot-lever H when the same is moved to the limit of its downward stroke, and thus holds the same, with the gear-frame, in an elevated position.

Having thus described my invention, I claim—

1. In a mowing-machine, a tongue, a vibrating frame independent of the tongue, a cutting apparatus hinged to said vibrating frame, and a lifting mechanism also supported on said frame for raising and lowering said cutting apparatus about its hinged connection, a grass or lead wheel adjustably connected to the front of said vibrating frame, and means, substantially as described, for adjusting said frame with reference to said grass-wheel to raise and lower said vibrating frame and thus raise and lower the cutting apparatus independent of the movement of said cutting apparatus about its hinged connection, substantially as specified.

2. In a mowing-machine, a tongue, a vibrating frame independent of said tongue, a cutting apparatus hinged to said vibrating frame, and a lifting mechanism also supported on said vibrating frame for raising and lowering said cutting apparatus about its hinged connection, a grass or lead wheel hinged to the front of said vibrating frame, a lifting-lever connected to the hinged support of said grass-wheel, said lifting-lever and its connections being also supported on said vibrating frame, and means for holding said lifting-lever in different positions of adjustment so that the vibrating frame, the hinged cutting apparatus and its lifting mechanism may be raised or lowered in relation to said grass-wheel independent of the movement of said cutting apparatus about its hinged connection with said frame, substantially as specified.

3. In a mowing-machine, two supporting-wheels, a main axle, a tongue, a vibrating frame independent of the tongue, and a cutting apparatus hinged to the frame, a lifting-lever also supported on said frame and connected to said cutting apparatus, a driving mechanism for operating said cutting apparatus, and a gear-shifting mechanism for engaging and disengaging said driving mechanism, a connection from said gear-shifting mechanism to said lifting-lever whereby a predetermined movement of said lifting-lever to lift said cutting apparatus in a vertical direction will operate said gear-shifting mechanism positively to disengage said driving mechanism independent of the movement of the tongue in relation to the frame, substantially as specified.

4. In a mowing-machine, having a hinged cutting apparatus and a lifting-lever for operating said cutting apparatus about its hinged connection, a knife-driving mechanism connected to said cutting apparatus, and a gear-shifter to disconnect said cutting apparatus by the operation of said lifting-lever, of a lock or stop adapted to permit a limited movement of said lever and cutting apparatus, said lock or stop being adapted to prevent a movement of said cutting apparatus beyond the operating limit of said knife-driving mechanism, substantially as specified.

5. In a mowing-machine, having a hinged cutting apparatus and knife-driving mechanism, a lifting-lever for operating said cutting apparatus about this hinged connection, and a gear-shifting device, adapted, by a movement of said lifting-lever, to automatically disengage said knife-driving mechanism, and a movable stop or lock adapted to prevent a movement of said lifting-lever to a point which will operate said shifting device by the revolution of said cutting apparatus, whereby said knife-driving mechanism is prevented from accidental disengagement by the raising of said cutting apparatus, substantially as specified.

6. In a mowing-machine, a main frame having a forwardly-projecting arm, depending brackets on said arm, each of said brackets being provided with bearings to support the cutting apparatus, an inner shoe on said cutting apparatus provided with projecting trunnions at the front and rear thereof to fit in the bearings on said brackets, one of said bearings being a solid bearing and the other a removable bearing, whereby a detachable hinged connection is secured between the frame and the cutting apparatus, substantially as specified.

7. In a two-wheeled mowing-machine, a vibrating gear-frame supported on the main axle which extends between the supporting-wheels, a lead or grass wheel pivotally connected to the inner front corner of the gear-frame, an operating-lever connected to the wheel to raise and lower the frame in relation to said wheel, a cutting apparatus hinged to the front corner of said vibrating gear-frame, said cutting apparatus being provided with an outer shoe having a rearwardly-extending portion with a supporting-wheel journaled therein, said outer supporting-wheel being arranged substantially in line with the main axle whereby the raising and lowering of the gear-frame on said grass-wheel raises and lowers said cutting apparatus substantially uniformly at each end, substantially as specified.

8. The combination with a vibrating gear-frame and a cutting apparatus hinged thereto, a lifting-lever on said gear-frame, driving mechanism for operating the cutting-knife also supported on said gear-frame, a movable clutch forming a portion of said driving mechanism, a spring-actuated bell-crank lever connected to said clutch, a rock-shaft connected to said bell-crank lever and a cam on said lifting-lever to contact with a movable part connected to said rock-shaft, and a lock or stop adapted to permit a limited movement of said lever and the cutting-knife, said lock or stop being adapted to prevent a movement of said cutting apparatus beyond the operating limit of said knife-driving mechanism, substantially as specified.

9. In a mowing-machine a vibrating gear-frame and a hinged cutting apparatus connected thereto, a driving mechanism for operating the cutting-knife, and a lifting-lever pivotally connected to said cutting apparatus so that a movement of said lever will elevate said cutting apparatus about its hinged connection, a gear-shifting device also supported on said vibrating frame and adapted to engage or disengage said knife-driving mechanism, a connection from said gear-shifting devices to said lifting-lever, and a stop or lock adapted to prevent a movement of said lifting-lever to a point which will operate said shifting devices by the elevation of said cutting apparatus, substantially as specified.

10. In a mowing-machine, a hinged cutting apparatus, a lifting-lever for raising and lowering the same, a knife-driving mechanism for driving said cutting apparatus, and a gear-shifter to disconnect said driving mechanism, an intermediate connection between said lifting-lever and said gear-shifter, contacting devices on said lever and intermediate connection for operating said gear-shifter, and means, substantially as described, for adjusting the relation of said contacting devices, substantially as specified.

11. The combination with a hinged cutting apparatus and its lifting-lever, a driving mechanism for driving said cutting apparatus, a spring-pressed clutch for engaging said driving mechanism, a main driving-shaft having a driving connection with said clutch, a rock-shaft mounted upon the main frame of the machine and extending longitudinally with the main driving-shaft, and a connection from said rock-shaft to said clutch to positively disengage said clutch when the rock-shaft is moved in one direction, and mechanism between said rock-shaft and the lifting-lever by which said rock-shaft is positively moved when said lifting-lever has reached a predetermined position and thus disengage said clutch and driving mechanism when the cutting apparatus has reached a predetermined elevated position, substantially as specified.

12. In a mowing-machine such as described, a vibrating frame having hinged thereto a cutting apparatus, a lifting-lever for said cutting apparatus supported on said vibrating frame, driving mechanism for operating said cutting apparatus, and a disengaging device for said driving mechanism supported on said vibrating frame and connected with said lifting-lever, and a spring also supported on said vibrating frame and connected with said lifting-lever and adapted to operate against the weight of said cutting apparatus, substantially as and for the purpose specified.

In testimony whereof I have hereunto set my hand this 14th day of February, A.D. 1893.

WILLIAM N. WHITELY.

Witnesses:
ROBERT C. RODGERS,
PAUL A. STALEY.